United States Patent
Fisher et al.

(10) Patent No.: US 9,126,192 B2
(45) Date of Patent: *Sep. 8, 2015

(54) PLATINUM GROUP METAL OXIDE SOLS

(75) Inventors: Janet Mary Fisher, Reading (GB); David Thompsett, Reading (GB)

(73) Assignee: Johnson Matthey Public Limited Company, London (GB)

( * ) Notice: Subject to any disclaimer, the term of this patent is extended or adjusted under 35 U.S.C. 154(b) by 1850 days.

This patent is subject to a terminal disclaimer.

(21) Appl. No.: 11/630,732

(22) PCT Filed: Jun. 17, 2005

(86) PCT No.: PCT/GB2005/002403
§ 371 (c)(1), (2), (4) Date: Dec. 21, 2006

(87) PCT Pub. No.: WO2005/123255
PCT Pub. Date: Dec. 29, 2005

(65) Prior Publication Data
US 2008/0039536 A1 Feb. 14, 2008

(30) Foreign Application Priority Data
Jun. 21, 2004 (GB) .................. 0413771.7

(51) Int. Cl.
*B01J 13/00* (2006.01)
*B01J 35/00* (2006.01)
(Continued)

(52) U.S. Cl.
CPC .............. *B01J 35/0013* (2013.01); *B01J 23/40* (2013.01); *B01J 31/0254* (2013.01);
(Continued)

(58) Field of Classification Search
CPC .... B01J 35/0013; B01J 35/06; B01J 31/0254; B01J 31/0239; B01J 37/16; B01J 37/0211; B01J 37/0215; B01J 23/40; B01J 27/24
USPC ......... 516/97; 106/287.18; 502/164, 170, 201
See application file for complete search history.

(56) References Cited

U.S. PATENT DOCUMENTS 2,760,940 A * 8/1956 Schwarzenbek .............. 502/334
4,361,500 A * 11/1982 Mathe et al. .................. 502/167
(Continued)

FOREIGN PATENT DOCUMENTS

CA 2 350 428 A1 5/2000
CA 2 479 261 A1 9/2003
(Continued)

OTHER PUBLICATIONS

Laurier L. Schramm, Colloids (Standard Article), Kirk Othmer Encyclopedia of Chemical Technology, Copyright © 2003 by John Wiley & Sons, Inc. , (Article Online Posting Date: Jul. 18, 2003) @ http://mrw.interscience.wiley.com/emrw/9780471238966/kirk/article/colblei.a01/current/abstract , (downloaded Sep. 2009), pp. 286-292.*
(Continued)

*Primary Examiner* — Daniel S Metzmaier
(74) *Attorney, Agent, or Firm* — RatnerPrestia

(57) ABSTRACT

A sol includes metal oxide nanoparticles and stabilizer ions dispersed in an aqueous liquid. The nanoparticles include a metal selected from the group of platinum, palladium, rhodium, iridium, ruthenium and osmium and the molar ratio of metal: stabilizer ions is at least 0.7. A method of preparing supported catalyst materials includes contacting the sols with support materials.

13 Claims, 1 Drawing Sheet

(51) Int. Cl.
  *B82Y 30/00* (2011.01)
  *B01J 23/40* (2006.01)
  *B01J 23/42* (2006.01)
  *B01J 31/02* (2006.01)
  *B01J 35/10* (2006.01)
  *B01J 37/02* (2006.01)
  *B01J 27/24* (2006.01)
  *B01J 37/16* (2006.01)

(52) U.S. Cl.
  CPC ............ *B01J 37/0211* (2013.01); *B82Y 30/00* (2013.01); *B01J 27/24* (2013.01); *B01J 31/0239* (2013.01); *B01J 35/006* (2013.01); *B01J 37/0215* (2013.01); *B01J 37/16* (2013.01)

(56) References Cited

U.S. PATENT DOCUMENTS

| | | |
|---|---|---|
| 5,227,356 A | 7/1993 | Hess et al. |
| 5,286,700 A | 2/1994 | Terui et al. |
| 5,976,476 A | 11/1999 | Blanchard et al. |
| 6,129,898 A | 10/2000 | Watkins et al. |
| 6,139,813 A | 10/2000 | Narula et al. |
| 6,291,392 B2 | 9/2001 | Hesse et al. |
| 6,592,842 B2 | 7/2003 | Elder et al. |
| 6,716,525 B1 | 4/2004 | Yadav et al. |
| 6,838,486 B2 | 1/2005 | Ryang |
| 6,986,818 B2 | 1/2006 | Tillotson et al. |
| 7,081,433 B2 | 7/2006 | Rolison et al. |
| 7,125,536 B2 | 10/2006 | Fu et al. |
| 7,244,688 B2 * | 7/2007 | Reetz et al. ............. 502/182 |
| 7,393,518 B2 | 7/2008 | Chiang et al. |
| 8,173,572 B2 * | 5/2012 | Feaviour ............. 502/304 |
| 2002/0028744 A1 | 3/2002 | Petit-Clair et al. |
| 2002/0128152 A1 | 9/2002 | Hesse et al. |
| 2003/0012942 A1 | 1/2003 | Larsen et al. |
| 2005/0123465 A1 | 6/2005 | Chane-Ching |
| 2005/0148464 A1 * | 7/2005 | Reetz et al. ............. 502/352 |
| 2008/0044692 A1 * | 2/2008 | Reetz et al. ............. 429/13 |
| 2011/0160050 A1 * | 6/2011 | Feaviour ............. 502/304 |

FOREIGN PATENT DOCUMENTS

| | | | |
|---|---|---|---|
| DE | 101 32 441 A1 | | 1/2003 |
| EP | 0 476 765 A1 | | 3/1992 |
| EP | 0 898 318 A2 | | 2/1999 |
| EP | 1 247 574 A1 | | 10/2002 |
| EP | 1 522 341 A1 | | 4/2005 |
| GB | 1 494 484 | | 12/1977 |
| GB | 2 126 205 A | | 3/1984 |
| JP | 5-38451 A | | 2/1993 |
| JP | 5-329366 A | | 12/1993 |
| JP | 2002-331095 | * | 1/2002 |
| JP | 2002-331119 | * | 1/2002 |
| WO | WO-00/27527 A1 | | 5/2000 |
| WO | WO-00/29332 A1 | | 5/2000 |
| WO | WO-00/47319 A1 | | 8/2000 |
| WO | WO-01/51202 A1 | | 7/2001 |
| WO | WO-03/078056 A1 | | 9/2003 |

OTHER PUBLICATIONS

Hara et al, "Photocatalytic Water Oxidation in a Buffered Tris(2,2'-bipyridyl)ruthenium Complex-Colloidal IrO2 System", J. Phys. Chem. A 2000, 104, 5275-5290 (May 2000).*
Kim et al, "A Sol-Gel Based Approach to Synthesize High Surface Area Pt-Ru Catalyst as Anodes for DMFCs", J of the Electrochemical Society, 150 (11) A1421-A1431 (Sep. 2003), obtained online @ http://scitation.aip.org/dbt/dbt.jsp?KEY=JESOAN&Volume=150 (downloaded Sep. 29, 2009).*
Machine Translation of JP 2002-001095 Japan patent Office, Tokyo, Japan (Downloaded Sep. 29, 2009).*
Machine Translation of JP 2002-001119 Japan patent Office, Tokyo, Japan (Downloaded Sep. 29, 2009).*
McMurray, H. Neil, "Uniform Colloids of Ruthenium Dioxide Hydrate Evolved by the Surface-Catalyzed Reduction of Ruthenium Tetroxide," *J. Phys. Chem.*, vol. 97, No. 30, 1993, pp. 8039-8045.
Hara, Michikazu and Mallouk, Thomas E., "Notocatalytic water oxidation by Nafion-stabilized iridium oxide colloids," *Chem. Commun.*, 2000, pp. 1903-1904.
International Search Report for Application No. PCT/GB2005/002382, dated Jan. 23, 2006.
Search Report for GB0413767.5, dated Sep. 23, 2004.

* cited by examiner

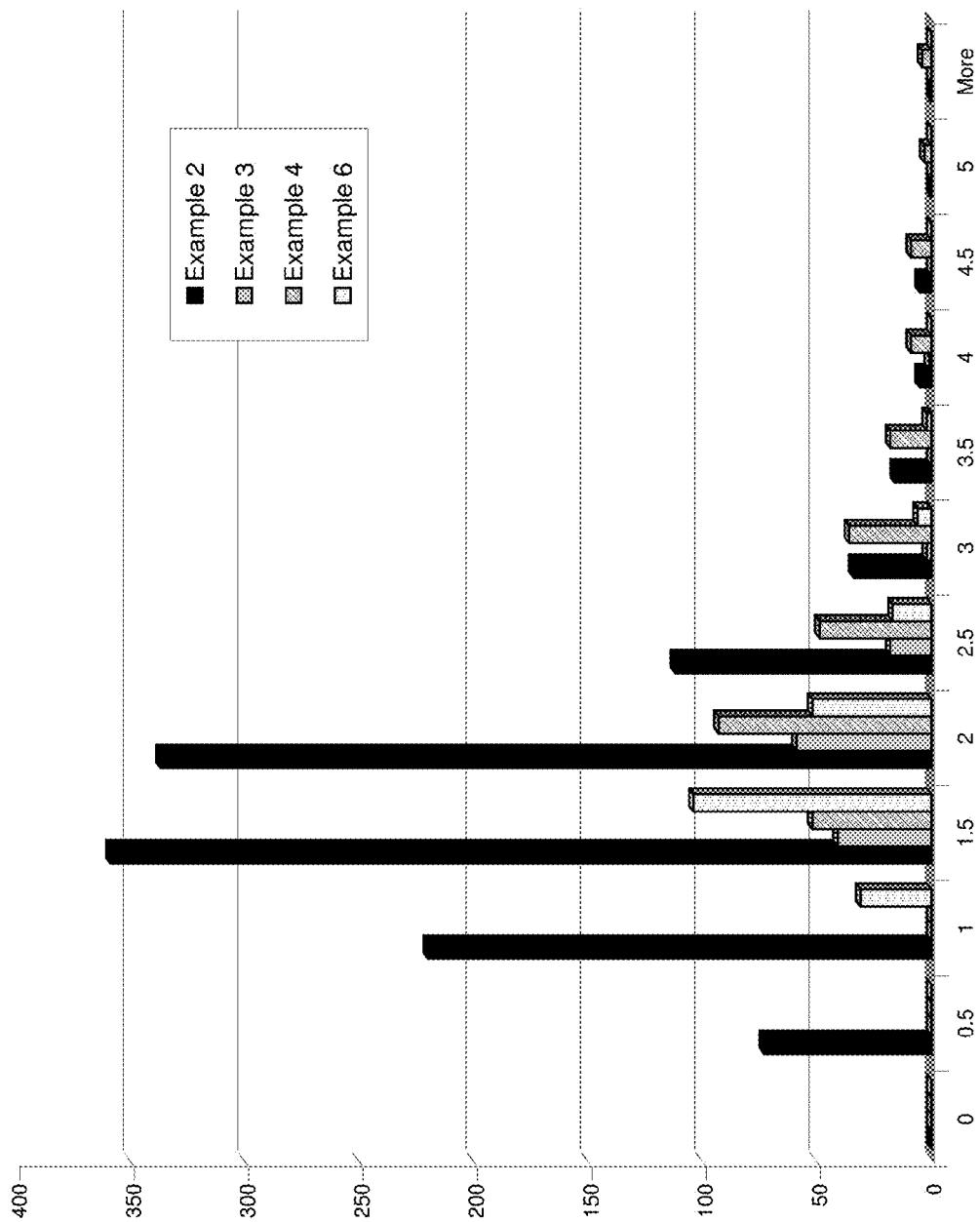

PLATINUM GROUP METAL OXIDE SOLS

This application is the U.S. National Phase application of PCT International Application No. PCT/GB2005/002403, filed Jun. 17, 2005, and claims priority of British Patent Application No. 0413771.7, filed Jun. 21, 2004.

FIELD OF THE INVENTION

The present invention relates to metal oxide sols wherein the metal is a platinum group metal. The invention further relates to methods of preparing supported catalyst materials using the metal oxide sols.

BACKGROUND OF THE INVENTION

Platinum group metals (platinum, palladium, rhodium, iridium, ruthenium and osmium) are commonly used in catalytic applications. The catalytic reactions take place at the surface of the metal, so it is usual to maximise the surface area of the metal by dispersing small particles of the metal on the surface of a support material. The support material is often an oxide material, and may be a functional oxide material that alters the catalytic activity of the metal. The support material may also be an electrically conducting material such as carbon. The metal may be deposited onto the support material by techniques wherein a metal salt is contacted with the support material so that a catalyst precursor is adsorbed onto the support. The support material may be heated to decompose the precursor to the catalytically active form of the metal.

EP 1 133 447 discloses an alternative method for depositing catalytically active metal onto a support material. Water-soluble metal oxide sols that are stabilised by compounds such as amphiphilic betains, surfactants and water-soluble polymers are used to deposit metal oxide particles onto support materials such as activated carbons and metal oxides. A sol is a colloidal dispersion of solid particles in a liquid. The molar ratio of metal to stabiliser compound in the disclosed sols is 0.5 or less, i.e. a large amount of stabiliser is required compared to the amount of metal. Such a large amount of stabiliser is undesirable when using the sol to prepare supported catalysts because of cost and because of the need to dispose of large quantities of stabiliser. Additionally, high temperature treatment may be necessary to remove the stabiliser from the catalyst and this may affect the catalyst activity, e.g. by causing sintering of catalytic metal particles.

The problem of removing stabilisers when preparing heterogeneous catalysts from metal oxide sols is addressed in WO 2003/078056. The disclosed process dispenses with the use of stabilisers and instead metal oxide colloids are synthesised in the presence of a catalyst support material so that the metal oxide nanoparticles may be immobilised on the support materials as they are synthesised. WO 2003/078056 does not disclose metal oxide sols that can be prepared, stored and subsequently used in a catalyst synthesis.

SUMMARY OF THE INVENTION

The present inventors have sought to provide sols of platinum group metal oxide nanoparticles that may be used to prepare catalytic materials. They have sought to reduce the quantities of stabiliser ions in the sols yet provide long-lasting sols that can be prepared, stored and subsequently used to synthesise catalysts.

Accordingly the present invention provides a sol comprising metal oxide nanoparticles dispersed in an aqueous liquid, wherein the nanoparticles comprise a metal selected from the group consisting of platinum, palladium, rhodium, iridium, ruthenium and osmium, and stabiliser ions, wherein the molar ratio of metal: stabiliser ions is at least 0.7.

BRIEF DESCRIPTION OF THE DRAWINGS

FIG. 1 is a graph illustrating the particle size of platinum oxide nanoparticles for Examples 2, 3, 4 and 6 as measured by transmission electron microscope (the x axis shows the size in nanoparticles, and the y axis shows the number of nanoparticles in that size range).

DETAILED DESCRIPTION OF THE INVENTION

The present invention provides a sol comprising metal oxide nanoparticles and stabiliser ions dispersed in an aqueous liquid. The nanoparticles comprise a metal selected from the group consisting of platinum, palladium, rhodium, iridium, ruthenium and osmium. The molar ratio of metal: stabiliser ions is at least 0.7, suitably at least 1, and preferably at least 2. The low level of stabiliser ions means that the sols are advantageously used to prepare catalysed support materials. The stabiliser ions are easily removed by low temperature treatment (and thus the nature of the catalyst is unaffected), and the environmental impact of stabiliser removal is low.

The metal oxide nanoparticles may contain only one metal, wherein the metal is selected from the group consisting of platinum, palladium, rhodium, iridium, ruthenium and osmium. Alternatively, the metal oxide nanoparticles may contain more than one metal, i.e. the nanoparticles are mixed metal oxide nanoparticles, wherein at least one of the metals is selected from the group consisting of platinum, palladium, rhodium, iridium, ruthenium and osmium. Preferably the metal is selected from the group consisting of platinum, iridium and ruthenium. Most preferably the nanoparticles comprise platinum.

The nanoparticles suitably have an average diameter of less than 10 nm, and preferably have an average diameter of less than 5 nm. The nanoparticles suitably have an average diameter of more than 1 nm. The sols can therefore be used to provide catalysed support materials with highly dispersed platinum group metal components.

The stabiliser ions are suitably discrete molecular species rather than polymeric species. The stabiliser ions may be cationic. Preferably, the stabiliser ions are quaternary nitrogen species of formula $R_4N^+$ wherein each R group may be the same or different and is chosen from the group consisting of alkyl, aryl and heterocyclic groups, any of which may be branched or unbranched, substituted or unsubstituted, provided that the $R_4N^+$ species is water-soluble. Preferably, the quaternary nitrogen species is a tetraalkylammonium species, e.g. tetramethylammonium, tetraethylammonium, tetrapropylammonium, tetrabutylammonium or trimethyl-ethylammonium, although other sterically hindered quaternary nitrogen species may also be effective. GB 2 126 205 discloses methods of preparing sols using quaternary ammonium hydroxide species. However, the methods are used to prepare sols of the oxides of tin, tungsten, molybdenum, vanadium, antimony and titanium and the present inventors could not prepare platinum group metal oxide sols using the methods described in the examples of GB 2 126 205.

Alternatively, the stabiliser ions may be anionic, and are suitably the anions of mineral acids, e.g. nitrate ions, or the anions of organic acids with a pKa (relative to water) of less than 8, e.g. acetate ions.

The concentration of metal oxide nanoparticles in the sol is suitably at least 5 g/l, preferably at least 10 g/l, more preferably at least 20 g/l and most preferably at least 40 g/l.

Various methods may be used to prepare the sols of the invention. A first method comprises a step of adding an acid or base to peptise a platinum group metal hydroxide. The acid or base provides the stabiliser ion. If the stabiliser ion is a quaternary nitrogen species, then the peptising agent is suitably the hydroxide of a quaternary nitrogen species. If the stabiliser ion is the anion of a mineral acid, then the peptising agent is the mineral acid. Suitable platinum group metal hydroxides such as $H_2Pt(OH)_6$ may be purchased. Alternatively, the platinum group metal hydroxide may be prepared from a platinum group metal salt solution wherein the platinum group metal exists in a low oxidation state (4 or less), e.g. salts of platinum, palladium, rhodium and iridium. An acidic platinum group metal precursor, preferably the platinum group metal nitrate, is reacted with a base such as sodium hydroxide, providing a hydroxide precipitate. The precipitate is suitably filtered and washed, and then resuspended in water before addition of acid or base to peptise the hydroxide.

A second method uses platinum group metal salt solutions wherein the platinum group metal exists in a high oxidation state (more than 4) and is especially suitable for making metal oxide sols wherein the metal is selected from the group consisting of rhodium, iridium, ruthenium and osmium. A salt, typically an oxo compound such as potassium perruthenate, is reacted with the hydroxide of a quaternary nitrogen species. This provides a salt (comprising platinum group metal oxo anions and quaternary nitrogen cations) which precipitates. The precipitate is suitably filtered and washed, and then resuspended in water. A reducing agent such as ethanol is added to reduce the platinum group metal to a lower oxidation state, and this provides a sol of the platinum group metal oxide stabilised by the quaternary nitrogen species.

The invention further provides a method of preparing a supported catalyst material comprising a step wherein a sol according to the invention is contacted with a support material. The sols are suitably used to provide supported catalyst materials wherein the loading of platinum group metal oxide on the support material is from 0.1-20 wt %.

The support material may be a metal oxide material or a carbon material. The metal oxide material is suitably a high-surface area metal oxide material (having a surface area greater than 50 m$^2$/g) and is preferably chosen from the group consisting of oxides and mixed oxides of aluminium, silicon, magnesium, titanium, cerium, zirconium, iron and tin. Suitable carbon materials include carbon black, graphite and activated charcoal.

To prepare the supported catalyst material, an impregnation method wherein the sol is contacted with a support material in powder form may be used. Suitably the powder and the sol are mixed, filtered and dried at a temperature of that is suitably not more than 200° C., preferably about 100° C. Alternatively, an absorption method wherein the sol is added to an aqueous slurry comprising particles of the support material may be used. Suitably the slurry and the sol are mixed, filtered and dried at a temperature of suitably not more than 200° C., preferably about 100° C. The sol may be used to deposit metal particles on a support material that is itself supported on a substrate such as a monolith, a foam or a filter. Support particles such as metal oxide particles can be deposited onto the substrate using techniques such as washcoating that are well known to the person skilled in the art. Suitably the sol is passed through the coated substrate, and the metal oxide nanoparticles are deposited onto the support material.

The substrate is dried at a temperature of suitably not more than 200° C., preferably about 100° C.

The metal oxide nanoparticles deposited on the support material may not be in the required catalytically active form, so it may be necessary to treat the catalysed support. Suitably the metal oxide nanoparticles are reduced, e.g. by passing a reducing gas such as hydrogen over the supported catalyst, or by passing a reducing liquid such as hydrazine over the supported catalyst.

The nanoparticles in the sols of the invention have a reasonably narrow particle size range so can be used to prepare supported catalysts wherein the catalytic particles have a similarly narrow size range. Catalytic properties are strongly influenced by the size of the catalytic particles, so catalysts prepared using sols of the invention will have different properties to catalysts prepared using metal salts.

EXAMPLES

The invention will now be described by reference to examples which are intended to be illustrative and not limiting of the invention.

Example 1

Platinum Oxide Sol Stabilised by Tetraethylammonium Ions

Platinum (IV) nitrate solution (from Johnson Matthey plc (UK), 27.4 g, 15.7% Pt equivalent 4.3 gPt) was diluted to ca. 150 ml with water. The pH was adjusted to 7.5 with sodium hydroxide and the precipitate that formed was allowed to settle for ca. 1 week. After 1 week the supernatant was a very pale colour, the precipitate was recovered by filtration and washed with 1 l water. The washed precipitate was reslurried in water to give 80 ml total volume and tetraethylammonium hydroxide (2.32 g, 35 w/wt %, 0.0055 mol) was added. The precipitate immediately peptised to give a clear deep red colloidal solution. The Pt concentration was measured by ICP as 52 g/l. The pH of the sol was approximately 9. The ratio of platinum: tetraethylammonium ions was 4:1.

Example 2

Platinum Oxide Sol Stabilised by Tetraethylammonium Ions

Tetraethylammonium hydroxide (10.7 g, 35 w/wt %, 25.6 mmol) was added to $H_2Pt(OH)_6$ (from Johnson Matthey plc (UK), 15.3 g, 65.27% Pt, 51.2 mmol). The slurry/paste was stirred and boiled for 1.5 h. It turned orange/red. Water (20 ml) was added and heating was continued for 15 mins. After cooling overnight the mixture was filtered and the volume of the filtrate was made up to 50 ml. Over several days the sol cleared and a small amount of non-dispersible material separated leaving a deep red product. The ratio of platinum: tetraethylammonium ions was 1.8:1. Particle size of the platinum oxide nanoparticles was measured by transmission electron microscope (TEM) and is shown in the FIGURE (the x axis shows the size in nanoparticles, and the y axis shows the number of nanoparticles in that size range).

Example 3

Platinum Oxide Sol Stabilised by Tetramethylammonium Ions

A sol was prepared as described in example 2 except that tetramethylammonium hydroxide was used instead of tetraethylammonium hydroxide. The ratio of platinum: tetramethylammonium ions was 2:1. Particle size of the platinum oxide nanoparticles was measured by TEM and is shown in the FIGURE.

Example 4

Platinum Oxide Sol Stabilised by Tetrabutylammonium Ions

A sol was prepared as described in example 2 except that tetrabutylammonium hydroxide was used instead of tetraethylammonium hydroxide. The ratio of platinum: tetramethylammonium ions was 2:1. Particle size of the platinum oxide nanoparticles was measured by TEM and is shown in the FIGURE.

Example 5

Platinum Ruthenium Oxide Sol Stabilised by Tetraethylammonium Ions

Platinum (IV) nitrate solution and ruthenium (III) chloride solution (both from Johnson Matthey plc, UK) were mixed to provide a solution containing Pt and Ru in a 1:1.84 molar ratio. The pH of the solution was adjusted to between 7 and 8 with sodium hydroxide and left overnight. The hydroxide precipitate was collected by filtration and washed in water. Tetraethylammonium hydroxide was added, peptising the precipitate to give a colloidal solution. The Pt and Ru concentrations were measured by ICP as 16.4 g/l and 15.6 g/l respectively. The ratio of metal (platinum and ruthenium): tetraethylammonium ions was 2:1.

Example 6

Platinum Ruthenium Oxide Sol Stabilised by Tetraethylammonium Ions

A sol was prepared as described in example 5 except that the molar ratio of Pt:Ru was 1:0.93. The Pt and Ru concentrations were measured by ICP as 13.2 g/l and 6.4 g/l respectively. The ratio of metal (platinum and ruthenium): tetraethylammonium ions was 2:1. Particle size of the platinum ruthenium oxide nanoparticles was measured by TEM and is shown in the FIGURE.

Example 7

Platinum Ruthenium Oxide Sol Stabilised by Tetraethylammonium Ions

A sol was prepared as described in example 5 except that the molar ratio of Pt:Ru was 1:0.49. The Pt and Ru concentrations were measured by ICP as 16.2 g/l and 4.1 g/l respectively. The ratio of metal (platinum and ruthenium): tetraethylammonium ions was 2:1.

Example 8

Platinum Titanium Oxide Sol Stabilised by Tetraethylammonium Ions

Titanium oxychloride (0.4 g, 1.28 mmol, [396 g/l $TiO_2$]) was diluted to ca. 5 ml with water. Platinum nitrate (4.55 g, 16.47% Pt, 3.84 mmol) was added and the volume adjusted to 35 ml. Sodium hydroxide (2M) was added with stirring until the pH was about 7. After 48 hours the precipitate was collected by filtration and washed with water (20 ml). Tetraethylammonium hydroxide (1.07 g, 2.56 mmol, 35 wt %) was added to the damp precipitate together with water (10 ml). Over 1 h and with gentle warning the precipitate digested to give a clear orange sol. The sol was diluted to 25 ml. The ratio of metal (platinum and titanium): tetraethylammonium ions was 2:1.

Example 9

Platinum Palladium Oxide Sol Stabilised by Tetraethylammonium Ions

Platinum nitrate (3.04 g, 16.47% Pt, 2.56 mmol) and palladium nitrate (1.93 g, 14.16% Pd, 2.56 mmol) were mixed and diluted to 100 ml. Sodium hydroxide (2 M) was added to adjust the pH to 7. When the mixture was boiled a precipitate was formed which was left for 48 hours. The precipitate was collected by filtration and washed but there were small amounts of Pt and Pd in the filtrate. The damp precipitate was digested with tetraethylammonium hydroxide (1.07 g, 2.56 mmol, 35 wt %) and water (10 ml). After boiling the mixture was filtered and the volume of the filtrate diluted to 25 ml. A dark red sol was obtained. The Pt and Pd concentrations were measured by ICP as 14.6 g/l and 8.1 g/l respectively. The ratio of metal (platinum and palladium): tetraethylammonium ions was 2:1.

Example 10

Iridium Oxide Sol Stabilised by Tetraethylammonium Ions 2.75 equivalents of tetraethylammonium hydroxide were added to iridium nitrate (from Johnson Matthey plc (UK)), precipitating iridium hydroxide. The recovered precipitate was treated with tetraethylammonium hydroxide. The solid peptised to give a dark-orange brown colloidal solution. The density of the sol was 1.16 $g/cm^3$. TEM measurements showed that the majority of the iridium oxide particles had a diameter of 1-3 nm. The ratio of iridium: tetraethyl ammonium was 5:1.

Example 11

Iridium Oxide Sol Stabilised by Nitrate Ions 2.75 equivalents of tetraethylammonium hydroxide were added to iridium nitrate (from Johnson Matthey plc (UK)), precipitating iridium hydroxide. The recovered precipitate was treated with nitric acid. The solid peptised to give a greenish solution. The density of the sol was 1.15 $g/cm^3$. TEM measurements showed that the majority of the iridium oxide particles had a diameter of 2-4 nm. The ratio of iridium: nitrate ions was 3.6:1.

Example 12

Ruthenium Oxide Sol Stabilised by Tetrabutylammonium Ions 1 g of $KRuO_4$ (from Johnson Matthey plc (UK)) was dissolved in 70 $cm^3$ water to give a dark yellow-green solution. This solution was cooled to 5° C. and 20 $cm^3$ of 40% tetrabutylammonium hydroxide solution was added, with the immediate precipitation of a green $Bu_4NRuO_4$. This was filtered and washed with cold water. The Bu$_4$NRuO$_4$ was resuspended in 100 cm$^3$ water and 1 cm$^3$ of ethanol added. The solid rapidly peptised to give a black colloidal solution, which was stable on standing for several weeks. The ratio of ruthenium: tetrabutylammonium ions was 1:1.

Example 13

Carbon-Supported Catalyst Prepared with Platinum Oxide Sol

Vulcan™ XC-72R carbon (Cabot, 7.5 g) was dispersed in water (400 ml) by mixing for 10 minutes. 12.5 ml of the platinum oxide sol prepared as described in example 2 was added to the carbon slurry, and the slurry was stirred for 16 hours. Formaldehyde solution (70 ml) was added and the slurry was heated. After boiling for 10 minutes the slurry was allowed to cool. The catalyst was collected by filtration and dried for 16 hours at 105° C. The platinum loading on the carbon was 24 wt % based on the weight of the carbon support. The particle size of the platinum particles as measured by x-ray diffraction was 2.3 nm. The metal area as measured by CO chemisorption was 83 m$^2$ g$^{-1}$.

Example 14

Carbon-Supported Catalyst Prepared with Platinum Oxide Sol

Example 13 was repeated except that the carbon was Ketjen™ EC 300 (Ketjen Black International Co.). The platinum loading on the carbon was 21 wt % based on the weight of the carbon support. The particle size of the platinum particles as measured by x-ray diffraction was less than 2 nm. The metal area as measured by CO chemisorption was 110 m$^2$ g$^{-1}$.

The invention claimed is:

1. A sol comprising
   (i) metal oxide nanoparticles dispersed in an aqueous liquid, wherein the nanoparticles comprise a metal selected from the group consisting of platinum, palladium, rhodium, iridium, ruthenium and osmium, the metal oxide nanoparticles having a diameter of less than 10 nm, and
   (ii) ions selected from the group consisting of: quaternary nitrogen species of formula R$_4$N$^+$ wherein each R group may be the same or different and is chosen from the group consisting of unsubstituted alkyl, aryl and heterocyclic groups, any of which may be branched or unbranched, provided that the R$_4$N$^+$ species is water-soluble; nitrate ions; and acetate ions,
   wherein the molar ratio of metal: the ions selected from the group consisting of: quaternary nitrogen species of formula R$_4$N$^+$ wherein each R group may be the same or different and is chosen from the group consisting of unsubstituted alkyl, aryl and heterocyclic groups, any of which may be branched or unbranched, provided that the R$_4$N$^+$ species is water-soluble; nitrate ions; and acetate ions is at least 0.7.

2. A sol according to claim 1, wherein the molar ratio of metal: the ions selected from the group consisting of: quaternary nitrogen species of formula R$_4$N$^+$ wherein each R group may be the same or different and is chosen from the group consisting of unsubstituted alkyl, aryl and heterocyclic groups, any of which may be branched or unbranched, provided that the R$_4$N$^+$ species is water-soluble; nitrate ions; and acetate ions is at least 1.

3. A sol according to claim 2, wherein the molar ratio of metal: the ions selected from the group consisting of: quaternary nitrogen species of formula R$_4$N$^+$ wherein each R group may be the same or different and is chosen from the group consisting of unsubstituted alkyl, aryl and heterocyclic groups, any of which may be branched or unbranched, provided that the R$_4$N$^+$ species is water-soluble; nitrate ions; and acetate ions is at least 2.

4. A sol according to claim 2, wherein: (1) the metal is platinum; and (2) the ions selected from the group consisting of: quaternary nitrogen species of formula R$_4$N$^+$ wherein each R group may be the same or different and is chosen from the group consisting of unsubstituted alkyl, aryl and heterocyclic groups, any of which may be branched or unbranched, provided that the R$_4$N$^+$ species is water-soluble; nitrate ions; and acetate ions are a tetraethyl ammonium species.

5. A sol according to claim 1, wherein the metal oxide nanoparticles have an average diameter of less than 5 nm.

6. A sol according claim 1, wherein the ions selected from the group consisting of: quaternary nitrogen species of formula R$_4$N$^+$ wherein each R group may be the same or different and is chosen from the group consisting of unsubstituted alkyl, aryl and heterocyclic groups, any of which may be branched or unbranched, provided that the R$_4$N$^+$ species is water-soluble; nitrate ions; and acetate ions are the quaternary nitrogen species of formula R$_4$N$^+$.

7. A sol according claim 6, wherein the quaternary nitrogen species of formula R$_4$N$^+$ is a tetraalkyl ammonium species.

8. A sol according to claim 7, wherein the tetraalkyl ammonium species is selected from the group consisting of a tetramethyl ammonium species, a tetraethyl ammonium species, a tetrapropyl ammonium species, a tetrabutyl ammonium species, and a trimethyl-ethyl ammonium species.

9. A sol according claim 7, wherein the tetraalkyl ammonium species is a tetraethyl ammonium species.

10. A sol according claim 1, wherein the ions selected from the group consisting of: quaternary nitrogen species of formula R$_4$N$^+$ wherein each R group may be the same or different and is chosen from the group consisting of unsubstituted alkyl, aryl and heterocyclic groups, any of which may be branched or unbranched, provided that the R$_4$N$^+$ species is water-soluble; nitrate ions; and acetate ions are nitrate ions.

11. A sol according claim 1, wherein the ions selected from the group consisting of: quaternary nitrogen species of formula R$_4$N$^+$ wherein each R group may be the same or different and is chosen from the group consisting of unsubstituted alkyl, aryl and heterocyclic groups, any of which may be branched or unbranched, provided that the R$_4$N$^+$ species is water-soluble; nitrate ions; and acetate ions are acetate ions.

12. A sol according claim 1, wherein the metal is platinum.

13. A sol according to claim 1, wherein: (1) the metal is platinum; and (2) the ions selected from the group consisting of: quaternary nitrogen species of formula R$_4$N$^+$ wherein each R group may be the same or different and is chosen from the group consisting of unsubstituted alkyl, aryl and heterocyclic groups, any of which may be branched or unbranched, provided that the R$_4$N$^+$ species is water-soluble; nitrate ions; and acetate ions are a tetraethyl ammonium species.

* * * * *

UNITED STATES PATENT AND TRADEMARK OFFICE
CERTIFICATE OF CORRECTION

| | |
|---|---|
| PATENT NO. | : 9,126,192 B2 |
| APPLICATION NO. | : 11/630732 |
| DATED | : September 8, 2015 |
| INVENTOR(S) | : Janet Mary Fisher et al. |

It is certified that error appears in the above-identified patent and that said Letters Patent is hereby corrected as shown below:

On the Title Page, Item [56], Page 2, References Cited, OTHER PUBLICATIONS:

"HARA, Michikazu and MALLOUK, Thomas E., "Notocatalytic water ..." should read
--HARA, Michikazu and MALLOUK, Thomas E., "Photocatalytic water ...--

On the Title Page, Item [56], Page 2, References Cited, OTHER PUBLICATIONS, please insert:

--Derwent Abstract, WPI, week 200328, London: Derwent Publications Ltd, AN 2003-286181, Class J04, KR 2002092067 A, (TIOCHEM CO LTD), abstract, p. 1.--

On the Title Page, Item [56], Page 2, References Cited, OTHER PUBLICATIONS, please insert:

--Bibliographic data & Abstract on ESPACENET, WO 03004152 A2 (2003-01-16), (STUDIENGESELLSCHAFT KOHLE MBH), p. 1.--

In the claims:

At column 8, line 13 of the Letters Patent, claim 4 (original claim 23): "A sol according to claim 2, wherein: (1) the metal is platinum; and (2) the ions selected from the group consisting of: quaternary nitrogen species of formula $R_4N^+$ wherein each R group may be the same or different and is chosen from the group consisting of unsubstituted alkyl, aryl and heterocyclic groups, any of which may be branched or unbranched, provided that the $R_4N^+$ species is water-soluble; nitrate ions; and acetate ions are a tetraethyl ammonium species."

Should read --A sol according to claim 2, wherein: (1) the metal is platinum; and (2) the ions are a tetraethyl ammonium species.--

Signed and Sealed this
Seventeenth Day of May, 2016

Michelle K. Lee
*Director of the United States Patent and Trademark Office*

CERTIFICATE OF CORRECTION (continued)
U.S. Pat. No. 9,126,192 B2

At column 8, line 40 of the Letters Patent, claim 10 (original claim 16): "A sol according claim 1, wherein the ions selected from the group consisting of: quaternary nitrogen species of formula $R_4N^+$ wherein each R group may be the same or different and is chosen from the group consisting of unsubstituted alkyl, aryl and heterocyclic groups, any of which may be branched or unbranched, provided that the $R_4N^+$ species is water-soluble; nitrate ions; and acetate ions are nitrate ions."

Should read --A sol according claim 1, wherein the ions are nitrate ions.--

At column 8, line 47 of the Letters Patent, claim 11 (original claim 17): "A sol according claim 1, wherein the ions selected from the group consisting of: quaternary nitrogen species of formula $R_4N^+$ wherein each R group may be the same or different and is chosen from the group consisting of unsubstituted alkyl, aryl and heterocyclic groups, any of which may be branched or unbranched, provided that the $R_4N^+$ species is water-soluble; nitrate ions; and acetate ions are acetate ions."

Should read --A sol according claim 1, wherein the ions are acetate ions.--

At column 8, line 55 of the Letters Patent, claim 13 (original claim 22): "A sol according to claim 1, wherein: (1) the metal is platinum; and (2) the ions selected from the group consisting of: quaternary nitrogen species of formula $R_4N^+$ wherein each R group may be the same or different and is chosen from the group consisting of unsubstituted alkyl, aryl and heterocyclic groups, any of which may be branched or unbranched, provided that the $R_4N^+$ species is water-soluble; nitrate ions; and acetate ions are a tetraethyl ammonium species."

Should read --A sol according to claim 1, wherein: (1) the metal is platinum; and (2) the ions are a tetraethyl ammonium species.--